Nov. 12, 1968   J. P. MALEC   3,410,491
VALVE MEANS
Filed Aug. 26, 1966   2 Sheets-Sheet 1
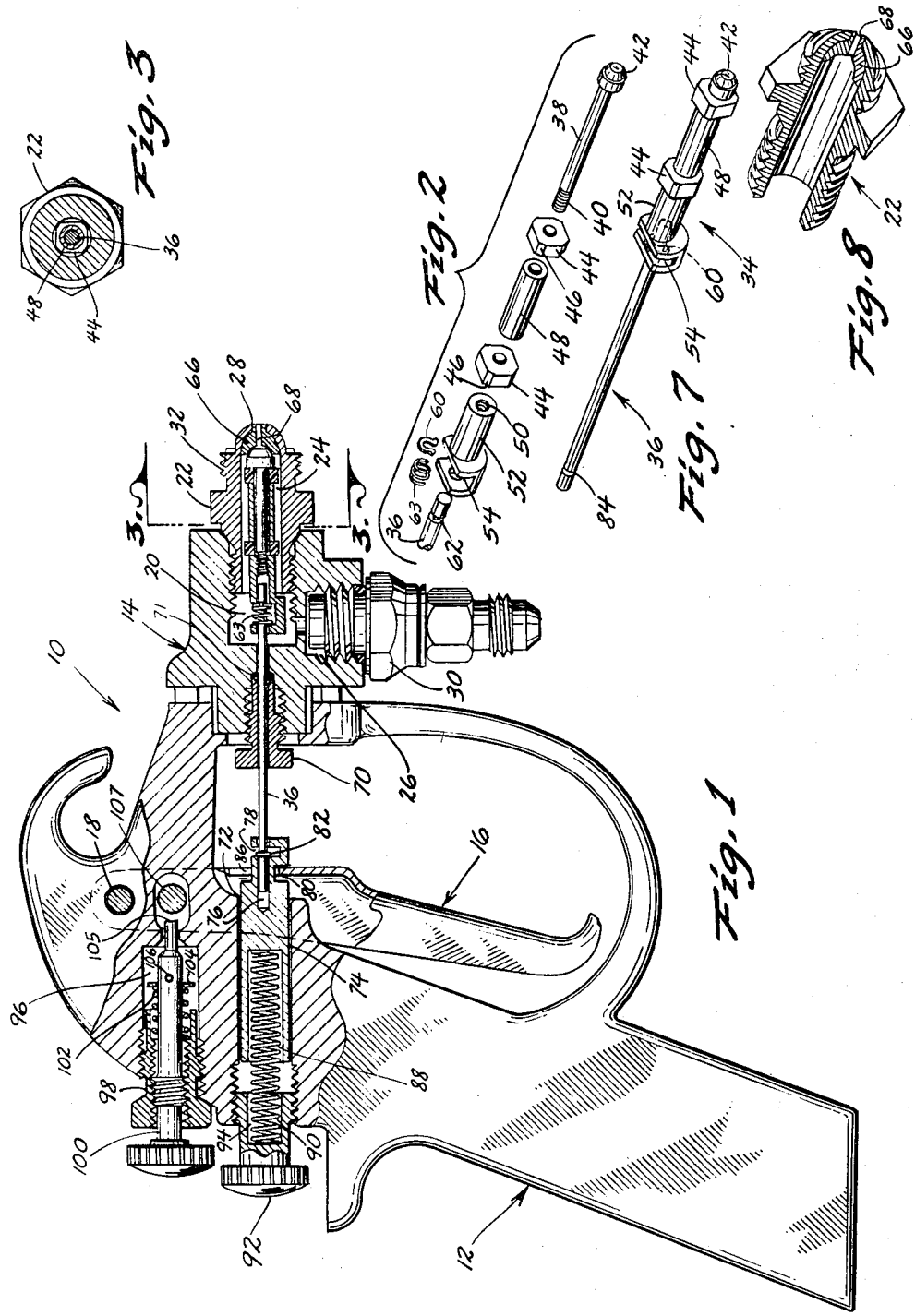
INVENTOR
JERRY P. MALEC
BY Dick, Zarley, McKee & Thomte
ATTORNEYS Nov. 12, 1968   J. P. MALEC   3,410,491

VALVE MEANS

Filed Aug. 26, 1966   2 Sheets-Sheet 2

INVENTOR
JERRY P. MALEC
BY Dick, Zarley, McKee & Thomte
ATTORNEYS

United States Patent Office 3,410,491
Patented Nov. 12, 1968

3,410,491
VALVE MEANS
Jerry P. Malec, Omaha, Nebr., assignor to Tri-Matic
Equipment Co., Omaha, Nebr., a corporation of
Nebraska
Filed Aug. 26, 1966, Ser. No. 575,353
16 Claims. (Cl. 239—526)

ABSTRACT OF THE DISCLOSURE

A device having a chamber with inlet and outlet openings and a valve member for opening and closing the spray outlet opening. An actuating member extends through a seal into the high pressure valve chamber for engagement with the valve member through a lost motion connection. A spring may be employed in the valve chamber in the lost motion connection to assist in snapping the valve member to an open position.

---

It is common for a spray nozzle employing paint or the like to have a few drops of a liquid form at the outlet port at the time the nozzle is shut off or is turned on. Moreover, another problem with conventional nozzles is that they have a tendency to clog when using heavy material such as paint or the like even though agitation is provided by constantly recirculating the paint.

Accordingly, it is one of the principal objects of this invention to provide a spray nozzle which is capable of instantaneous shut-off and opening which prevents spitting or dripping at the nozzle outlet port.

It is another related object of this invention to provide a spray gun having a nozzle which includes a valve freely movable for a limited distance between open and closed positions whereby the valve member is actuated by fluid pressures to its open position and to its closed position.

A still further related object of this invention is to provide a nozzle having a movable valve mounted therein which is actuated mechanically to a position adjacent the closed position and finally to its fully closed position by the application of fluid pressures within the valve chamber and similarly the valve member is moved to its partially open position mechanically and to a fully open position by the fluid pressures within the valve chamber.

Another object of this invention is to provide a spring means for assisting fluid pressures in snapping said valve member to an open position after it has been partially moved towards an open position.

It is a further related object of this invention to provide a nozzle having a valve actuating trigger which is coupled to the valve member by a lost motion connection.

A still further related object of this invention is to provide a spray nozzle having a valve member coupled to an actuating member through a lost motion connection and a trigger member coupled to the actuating member through a second lost motion connection.

Another object of this invention is to provide a valve member movably disposed on at least one metallic guide element within the valve chamber.

Another related object of this invention is to provide a valve member having a convex portion for mating engagement with a concave seat portion extending across the outlet port.

A still further object of this invention is to provide a spray gun having a trigger operated valve member wherein the pressure on the trigger member is selectively varied.

Another related object of this invention is to provide a spray gun having a trigger member which is limited against pivotal movement by an adjustable stop member.

Another related object of this invention is to provide a spray gun having a trigger member with an adjustable stop member wherein the stop member is limited against accidental dislocation.

A still further object of this invention is to provide a spray nozzle having a carbide seat which is unaffected by abrasive material such as paint or the like under pressures exceeding 3000 p.s.i.

A further object of this invention is to provide a spray nozzle which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a fragmentary side elevation view of the spray gun;

FIG. 2 is an exploded perspective view of the valve member;

FIG. 3 is a cross-sectional view taken along line 3—3 in FIG. 1 illustrating in particular the value member and guides within the valve chamber;

FIG. 7 is a perspective view of the valve member assembled and connected to the actuating member; and FIG. 8 is a fragmentary perspective view of the nozzle sleeve member.

Figure 4:
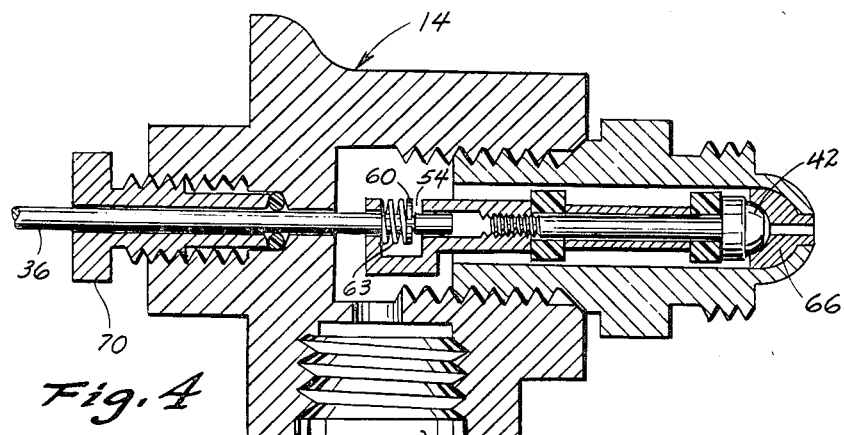
FIG. 4 is a cross-sectional view of the nozzle end of the spray gun and showing the valve member in its fully closed position.

In FIG. 1 the spray nozzle is referred to generally by the reference numeral 10 and includes a handle member 12 and a barrel body member 14. A trigger 16 is pivotally connected to the upper end of the handle member 12 by a pin 18.

The barrel body member 14 is provided with a longitudinally extending valve chamber 20 which receives a sleeve member 22 having a valve chamber 24 in communication with the valve chamber 20. An inlet opening 26 is in communication with the valve chamber 20 and an outlet opening 28 extends through the outer end of the sleeve member 22 and is in communication with the valve chamber 24. An adapter element 30 is threadably secured in the inlet opening 26 and is adapted to be connected to a fluid pressure source, not shown. If desired, adapter nozzles may threaded onto the outer end of the sleeve 22 and engage external threads 32 formed thereon.

A valve assembly 34 is disposed within the valve chambers 20 and 24 and is connected to an actuating member 36 as seen in FIG. 2. The valve assembly includes a rod element 38 having threads 40 at one end and a convex hemispherical portion 42 at the opposite end. A pair of Teflon guide elements 44 generally square in cross-section with their corners removed to form flat surfaces 46 are provided on opposite sides of an elongated sleeve element 48, all of which are mounted on the rod member 38 against the hemispherical portion 42. The threaded end 40 of the rod 38 is received in a threaded bore 50 in a member 52. Member 52 is provided with a slot 54 which extends in a plane which is transversely of the valve member's longitudinal axis. The bore 50 extends the full length of the member 52 and is in communication with the slot 54.

The actuating rod 36 is positioned in the bore 50 and a lock washer 60 is received in an annular groove 62 when the groove is within the slot 54 of the member 52. A coil spring 63 is mounted on the rod 36 in the slot 54 and bears against the rear side of the washer 60. Since the washer 60 will compress the spring 63 when the rod 36 is pulled rearwardly, a lost motion connection is made between the actuating member 36 on the valve 34.

The convex hemispherical end portion 42 on the rod 38 is adapted to matingly engage a carbide seat 66 in the sleeve 22. An elongated hole 68 is formed in the carbide seat 66 in alignment with the outlet port 28. The guides 44 serve to align the hemispherical convex end portion 42 for mating engagement with the concave seat 66.

The actuating rod 36 extends toward the handle 12 and through a packing gland 70 threadably secured to the barrel body 14 on the opposite side from the sleeve member 22. A reel 71 is pivoted ahead of the packing gland 70.

An elongated passageway 72 is formed in the handle 12 and is in alignment with the actuating rod 36. A slidable member 74 is received in the passageway 72 and has a bore 76 to receive the free end of the actuating rod 36. A pair of oppositely disposed slots 78 and 80 are formed in the slidable member 74. The slot 78 communicates with the bore 76 and the actuating rod 36 extends across the slot 78. A lock washer 82 is mounted in a groove 84 (FIG. 2) on the actuating rod 36 and is disposed within the slot 78 and permits relative longitudinal movement of the actuating rod 36 relative to the slidable member 74 as the lock washer 82 has a thickness which is less than the width of the slot 78 measured along the longitudinal axis of the actuating rod 36. A vertical slot 86 is formed in the trigger 16 to receive the slidable member 74 at the slot 80. The slot 80 is made sufficiently large to avoid binding action on the trigger 16 as it is pivoted back and forth.

The opposite end from the actuating rod 36 is provided with an elongated bore 88 which receives a coil spring 90 for urging the slidable member 74 toward the nozzle end of the spray gun and an adjustable member 92 is threadably inserted into the rear end of the bore 72 and has a bore 94 for receiving the other end of the spring 90. Accordingly the pressure against the slidable member 74 may be selectively varied. As seen in FIG. 1, the slidable member 74 normally maintains the trigger 16 in a position outwardly of the handle 12 and accordingly the valve portion 42 in engagement with the seat 66.

Above the actuating rod 36 and the slidable member 74 a second bore 96 is provided in the handle 12 and receives a threaded sleeve 98 which has a threaded stop pin 100 extending therethrough. A coil spring 102 is mounted on the stop rod 100 and bears against a washer 104 held on the rod 100 by a pin 106. The opposite end of the spring 102 bears against the inner end of the sleeve 98 and thereby maintains a tight fit between the threads on the stop rod 100 and the sleeve 98 as seen in FIG. 1. The inner end of the stop rod 100 is provided with a reduced in cross-section pin portion 105 which is adapted to engage a cross bar circular in cross-section 107 on the handle 16. The stop rod 100 may be adjusted to any desired position to give the desired pivotal movement to the trigger 16 and thereby permit the desired opening of the valve. The preferred function of the stop rod 100 is to lock the valve in its closed position.

Figure 5:
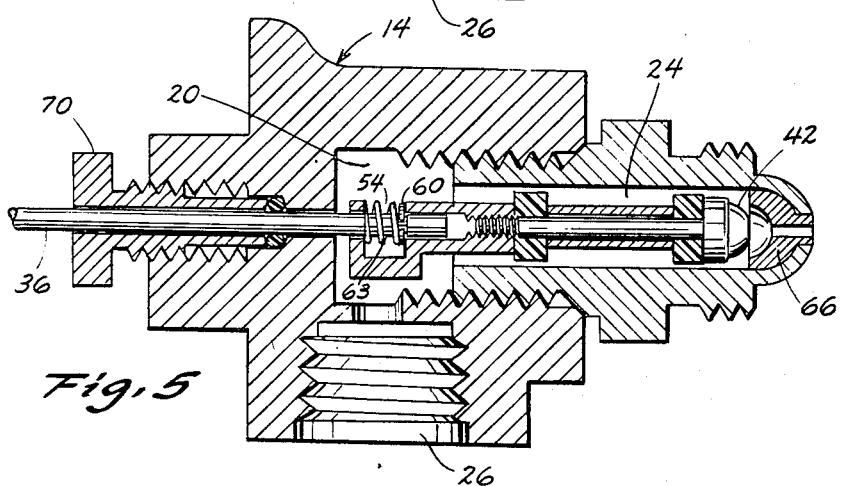
FIG. 5 is a view similar to FIG. 4 but showing the valve member in the position to which it is moved by pressures within the valve chamber acting on the valve member after the seal between the valve member and its valve seat is broken.
Figure 6:
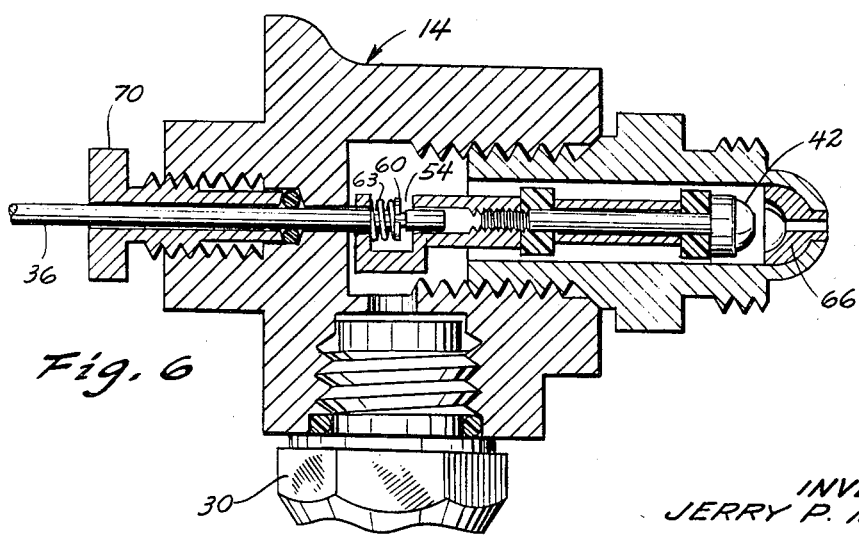
FIG. 6 is a view similar to FIGS. 4 and 5 but showing the valve member moved to its fully open position by the actuating member.

In operation it is seen from FIGS. 4, 5 and 6 that in FIG. 4 the valve portion 42 is seated against the seat 66 in its normally closed position. The actuating rod 36 is moved to a poistion with the lock washer 60 compressing the spring 63 (FIG. 4) in pulling the valve to an open position as shown in FIG. 5. Once the seal between the valve portion 42 and the seat 66 is broken the fluid pressures within the chambers 20 and 24 cause the valve to instantaneously snap open moving it against the lock washer 60. The compressed spring 63 contributes substantially to the snap opening of the valve. Once the seal is broken the stored energy in the spring 63 under compression and the fluid pressure combine to instantaneously snap the valve 36 rearwardly to its substantially fully open position of FIG. 5. The actuating rod 36 may then be further retracted by the trigger 16 to mechanically withdraw the valve to its fully open position of FIG. 6. It is further seen that since the slots 54 and 78 which receive the lock washers 60 and 82 respectively form lost motion connections between the valve 34 and the slidable member 74 that considerable free movement is permitted by the valve member 34 under the fluid and spring pressures. Once the valve 34 begins to open under the fluid pressures, the valve 34 will move to its position of FIG. 5 and then move further by pushing the actuating rod 36 until it is stopped by engagement of the lock washer 82 with the side wall of the slot 78 adjacent the trigger 16. A small amount of free movement will occur in further retracting the trigger 16 before engagement is made with the actuating rod 36 to move it and the valve 34 to its fully open position of FIG. 6.

Similary, when the trigger 16 is released under the pressure of the spring 90 and the valve 34 is moved to its right hand position closely adjacent the seat 66 until the fluid pressures begin to assist the movement of the valve to its closed position and at this moment the valve member 34 instantaneously moves to its fully closed position due to the free travel permitted by the slots 54 and 78. The handle 16 may then be released and the valve 34 will be positively held in its closed position.

Thus it is seen that by the instantaneous movement of the valve 34 between its open and closed positions due to the fluid pressures rather than the mechanical linkage coupling it to the trigger 16, there is absolutely no spitting when the valve is opened or dripping when it is closed since it is either substantially open or completely closed at all times.

The instantaneous movement contributes substantially to a longer life for the valves carbide ball and seat parts in excess of a conventional type of opening and closing mechanism. Paint particles are generally abrasive in character and a slowly opening or closing valve means permits the valve means sealing surface to wear as the abrasive particles pass between mating members under high fluid pressure.

Some changes may be made in the construction and arrangement of my valve means without departing from the real spirit and purpose of my invention, and it is my intention to cover by my claims, any modified forms of structure or use of mechanical equivalents which may be reasonably included within their scope.

I claim:

1. A valve assembly, comprising:
   a body member,
   a chamber in said body member, said body member having an outlet and an inlet port in communication with said chamber, said inlet port adapted to be connected to a pressure source,
   a valve member movably disposed in said chamber for selectively closing said outlet port, said chamber having a valve seat adapted to matingly engage a portion of said valve member,
   an actuating member connected to said valve member for moving said valve member between open and closed positions, said connection between said actuating member and said valve member being a lost motion connection and being located in said chamber permitting limited free movement of said valve member relative to said actuating member whereby upon said actuating member moving said valve member to a position closely adjacent said valve seat the pressure in said chamber is adapted to snap said valve member to its closed position, and upon said actuating member moving said valve member to a partially open position the pressure in said chamber is adapted to snap said valve to an open position.

2. The structure of claim 1 wherein said valve member portion includes a hemispherical convex surface and said valve seat includes a hemispherical concave seat for mating engagement with said convex surface.

3. The structure of claim 1 wherein said valve member portion includes a hemispherical convex surface and said valve seat includes a hemispherical concave seat for mating engagement with said convex surface, said valve seat being formed from carbide material.

4. The structure of claim 1 and a spring means engaging said actuating member and normally urging said valve member to its closed position.

5. The structure of claim 1 and said connection between said actuating member and said valve member in said chamber includes a spring means, said spring means being positioned to be compressed upon said actuating member being moved to move said valve towards said open position and said spring means being adapted to assist in snapping said valve member to said open position.

6. A spray nozzle, comprising:
a body member having an elongated chamber and outlet and inlet openings in communication with said chamber, said outlet opening being disposed at one end of said chamber,
an elongated valve member disposed in said elongated chamber and adapted to move between open and closed positions, an end portion on said valve adapted to engage said one end of said chamber and close said outlet opening when said valve member is in said closed position,
an actuating member movably extending into said chamber along an axis parallel to the longitudinal axis of said valve member, said actuating member having an inner end adjacent said other end of said valve member, and
cooperating means in said chamber on said other end of said valve member and said inner end of said actuating member for loosely interconnecting said actuating member and said valve member thereby providing a lost motion connection between said actuating member and said valve member in said chamber, said cooperating means including positive stop means for limiting relative longitudinal movement towards and away from said outlet opening.

7. The structure of claim 6 and a handle member is secured to said body member and arranged for said body member to define the barrel of a pistol-type spray gun, and a trigger member operatively engaging said actuating member, said handle having a passageway formed therein in axial alignment with the longitudinal axis of said actuating member, a slidable member disposed in said passageway, said slidable member having a bore disposed in axial alignment with the longitudinal axis of said actuating member, said actuating member being received in said bore, said slidable member having a pair of slots formed in one end adjacent said trigger, said slots being disposed in planes extending perpendicularly to the longitudinal axis of said slidable member, said trigger member having a portion loosely received in one of said slots and a stop element loosely received in said other slot and secured to said actuating member, said stop element adapted to move with said actuating member axially of said bore within said slot.

8. The structure of claim 6 wherein said valve member includes at least one non-metallic guide portion being disposed between said one end and said other end, said non-metallic guide portion having a longer perimetrical dimension than the adjacent portions of said valve member, said non-metallic portion adapted to engage the sidewall of said chamber at times and support said one end of said valve member such that said valve member is longitudinally centered in said chamber.

9. The structure of claim 6 wherein said cooperating means on said other end of said valve member includes a longitudinally extending axial bore and a slot formed in said valve member extending transversely of and communicating with said longitudinal axial bore, and said actuating member being slidably received in said bore and extending across said slot, said cooperating means on said actuation member including a lock element secured thereto and disposed in said slot, said lock element having a thickness substantially smaller than the length of said slot measured along the longitudinal axis of said bore.

10. The structure of claim 6 wherein in said valve chamber a coil spring means is positioned on said actuating member and is positioned in said slot for engagement at one end with said lock element and at the other end with the side wall of said slot remote from said valve member whereby said spring means is adapted to be compressed upon said actuating member being moved to move said valve towards said open position and said spring means being adapted to assist in snapping said valve member to said open position.

11. The structure of claim 6 and a handle member is secured to said body member and arranged for said body member to define the barrel of a pistol-type spray gun, and a trigger member operatively engaging said actuating member, said trigger member being pivoted to said handle at a point remote from said actuating member, and an adjustable stop means provided on said handle member for limiting the pivotal movement of said trigger member.

12. The structure of claim 11 wherein said handle member has a threaded bore and said adjustable stop means includes a pin element threadably engaging said threaded bore in said handle member, and a spring mounted on said pin element and operatively engaging said handle member at one end and secured to said pin element at the opposite end to maintain a tight fit between the threads on said pin element and the threads in said threaded bore.

13. The structure of claim 6 and a handle member is secured to said body member and arranged for said body member to define the barrel of a pistol-type spray gun, and a trigger member operatively engaging said actuating member, said handle having a passageway formed therein in axial alignment with the longitudinal axis of said actuating member, a slidable member disposed in said passageway, said slidable member having a bore disposed in axial alignment with the longitudinal axis of said actuating member, said actuating member being received in said bore, said slidable member having a slot formed in one end and communicating with said bore in said slidable member and extending in a plane perpendicular to the longitudinal axis of said bore, a stop element secured to said actuating member and disposed within said slot, and said stop element having a thickness substantially less than the length of said slot measured along the longitudinal axis of said bore.

14. The structure of claim 13 wherein a spring means is disposed in said bore in said handle and engages said slidable member for urging it towards said outlet opening in said body member whereby said valve member is moved to its closed position.

15. The structure of claim 14 wherein means engages said spring in said handle member for varying the pressure on said slidable member.

16. A spray gun, comprising:
a handle member having a barrel body member extending therefrom,
said body member having an elongated valve chamber and a valve member movably disposed therein,
said handle member having a passageway and a slidable member disposed therein,
an actuating member extending between said valve member in said chamber and said slidable member,
spaced apart stop means disposed each on said handle and said valve member,
shoulder portion secured to said actuating member in spaced apart relationship, one of said shoulder means being disposed between said stop means on said handle and said other stop means disposed between said stop means on said valve member, each of said shoulders having a thickness measured along the longitudinal axis of said actuating member substantially less than the length of said respective slots to permit lost motion between said actuating member and said slidable member and said valve member, a trigger member operatively connected to said actuating member, and said body member having inlet and outlet ports, said valve member adapted to move between a closed position with said valve member along said outlet port to an open position with said valve member moved away from said outlet port.

References Cited

UNITED STATES PATENTS

| | | | |
|---|---|---|---|
| 1,940,268 | 12/1933 | Peterson | 239—526 XR |
| 2,991,940 | 7/1961 | Dupler et al. | 239—583 XR |
| 3,219,279 | 11/1965 | Peeps | 239—583 |

WALTER SOBIN, *Primary Examiner.*